United States Patent
Bishop

(10) Patent No.: US 11,459,089 B1
(45) Date of Patent: Oct. 4, 2022

(54) PROPELLER BLADE HAVING AN END PLATE

(71) Applicant: Hamilton Sundstrand Corporation, Charlotte, NC (US)

(72) Inventor: Allen J. Bishop, Glen Mills, PA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/236,101

(22) Filed: Apr. 21, 2021

(51) Int. Cl.
    B64C 11/16 (2006.01)
    B64C 11/18 (2006.01)
    B64C 11/04 (2006.01)

(52) U.S. Cl.
    CPC .............. B64C 11/18 (2013.01); B64C 11/04 (2013.01)

(58) Field of Classification Search
    None
    See application file for complete search history.

(56) References Cited

U.S. PATENT DOCUMENTS

| | | | | |
|---|---|---|---|---|
| 3,745,300 A | * | 7/1973 | Holko et al. | B23K 11/002 219/107 |
| 4,302,155 A | | 11/1981 | Grimes et al. | |
| 4,314,892 A | * | 2/1982 | Stevens | C25D 5/56 205/158 |
| 5,645,250 A | * | 7/1997 | Gevers | B64D 27/00 244/101 |
| 5,836,744 A | * | 11/1998 | Zipps | F04D 29/388 416/193 A |
| 5,863,181 A | * | 1/1999 | Bost | B64C 11/205 416/224 |
| 6,283,705 B1 | * | 9/2001 | Rice | F01D 17/162 415/160 |
| 6,461,105 B1 | * | 10/2002 | Nicolson | F01D 17/165 415/160 |
| 6,607,168 B1 | * | 8/2003 | Cordier | B63B 21/66 244/199.1 |
| 7,806,652 B2 | * | 10/2010 | Major | F04D 29/563 415/160 |
| 8,500,395 B2 | * | 8/2013 | Roby | F01D 17/165 415/164 |
| 9,809,299 B2 | | 11/2017 | Udall et al. | |
| 2006/0186261 A1 | * | 8/2006 | Unzicker | B64C 3/50 244/12.1 |
| 2015/0110633 A1 | | 4/2015 | Nagle et al. | |
| 2017/0313404 A1 | * | 11/2017 | Colmagro | B64C 11/06 |
| 2020/0010173 A1 | * | 1/2020 | Scully | F03D 1/0641 |

FOREIGN PATENT DOCUMENTS

| | | | | |
|---|---|---|---|---|
| EP | 1918521 A2 | * | 5/2008 | ........... F04D 29/563 |
| WO | WO-2019116983 A1 | * | 6/2019 | ........... F04D 29/324 |

* cited by examiner

*Primary Examiner* — Michael Lebentritt
(74) *Attorney, Agent, or Firm* — Cantor Colburn LLP

(57) ABSTRACT

A propeller blade having a blade body including a blade base, a blade tip, a pressure side surface, and, a suction side surface. Each of the pressure side surface and the suction side surface extend between the blade base to the blade tip. An end plate is provided on the blade body. The end plate is exposed to an airflow and positioned at the blade base. The end plate projects outwardly of at least a portion of one of the pressure side surface and the suction side surface.

20 Claims, 5 Drawing Sheets

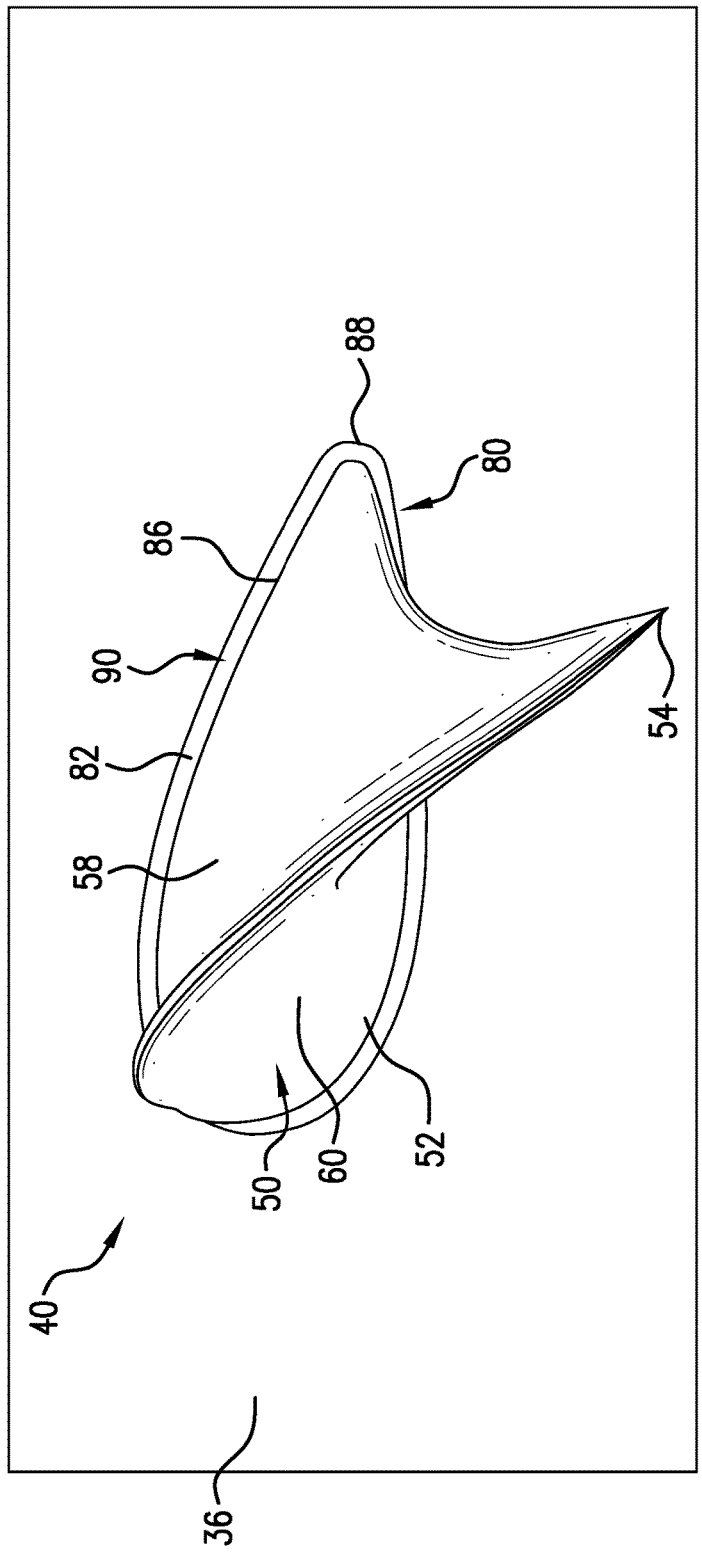
FIG.5
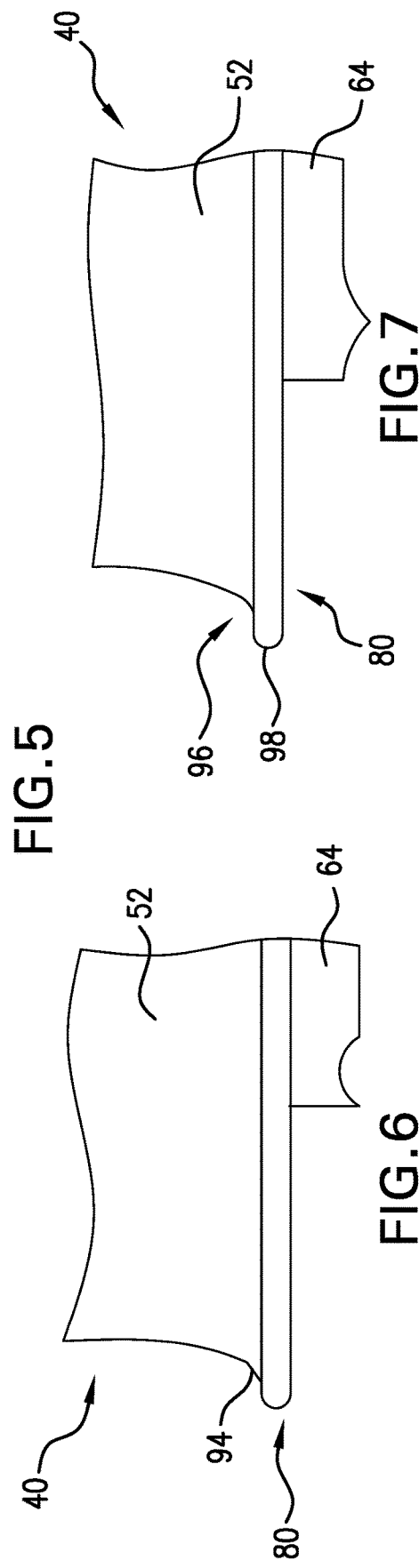
FIG.6
FIG.7

PROPELLER BLADE HAVING AN END PLATE

BACKGROUND

Exemplary embodiments pertain to the art of propeller blades and, more particularly, to a propeller blade having an end plate.

Propeller driven aircraft may include fixed propellers and variable pitch propellers. A variable pitch propeller may be selectively rotated about a longitudinal axis to change blade pitch. Changing blade pitch allows a pilot to adjust the propeller to different thrust levels. Changing thrust enhances aircraft control and increases efficiency when on the ground (taxiing), when landing, and during flight. Typically, a propeller blade extends from a shank through a spinner to a blade tip portion. The spinner houses linkages that connect with the shank to control blade pitch. The propeller blade includes aerodynamic surfaces that extend from a blade root connected to the shank to the blade tip portion.

Gaps exist between surfaces of the spinner and the shank. Airflow may spill through those gaps and create localized vortices that may migrate up the propeller blade. The vortices may negatively impact airflow over the aerodynamic surfaces thereby reducing blade efficiency.

BRIEF DESCRIPTION

Disclosed is a propeller blade having a blade body including a blade base, a blade tip, a pressure side surface, and, a suction side surface. Each of the pressure side surface and the suction side surface extend between the blade base to the blade tip. An end plate is provided on the blade body. The end plate is exposed to an airflow and positioned at the blade base. The end plate projects outwardly of at least a portion of one of the pressure side surface and the suction side surface.

Additionally, or alternatively, in this or other non-limiting examples, the end plate projects outwardly of the pressure side surface and the suction side surface.

Additionally, or alternatively, in this or other non-limiting examples, the end plate includes a radial thickness.

Additionally, or alternatively, in this or other non-limiting examples, the radial thickness is substantially uniform.

Additionally, or alternatively, in this or other non-limiting examples, the end plate includes an axial thickness that is substantially uniform.

Additionally, or alternatively, in this or other non-limiting examples, a blade root that extends outwardly of the blade base, the end plate creating a physical barrier between the blade body and the blade root.

Additionally, or alternatively, in this or other non-limiting examples, an interface region defined between the blade body and the end plate, the interface region including one of a fillet and a chamfer.

Additionally, or alternatively, in this or other non-limiting examples, the end plate includes an outwardly facing edge, the outwardly facing edge including an angled profile.

Additionally, or alternatively, in this or other non-limiting examples, the angled profile is curvilinear.

Additionally, or alternatively, in this or other non-limiting examples, the end plate projects outwardly of the blade base substantially entirely about the blade body.

Also disclosed is an aircraft including a fuselage, an engine supported by the fuselage, and a propeller blade operatively connected to the engine and housed in a spinner. The propeller blade has a blade body including a blade base, a blade tip, a pressure side surface, and, a suction side surface, each of the pressure side surface and the suction side surface extending between the blade base to the blade tip. An end plate is provided on the blade body and positioned at the blade base radially outwardly of the spinner. The end plate is exposed to an airflow and projects outwardly of at least a portion of one of the pressure side surface and the suction side surface.

Additionally, or alternatively, in this or other non-limiting examples, the end plate projects outwardly of the pressure side surface and the suction side surface.

Additionally, or alternatively, in this or other non-limiting examples, the end plate includes a radial thickness.

Additionally, or alternatively, in this or other non-limiting examples, the radial thickness is substantially uniform.

Additionally, or alternatively, in this or other non-limiting examples, the end plate includes an axial thickness that is substantially uniform.

Additionally, or alternatively, in this or other non-limiting examples, the spinner includes an opening through which extends the propeller blade, the end plate creating a physical barrier between the blade body and the opening.

Additionally, or alternatively, in this or other non-limiting examples, an interface region defined between the blade body and the end plate, the interface region including one of a fillet and a chamfer.

Additionally, or alternatively, in this or other non-limiting examples, the end plate includes an outwardly facing edge, the outwardly facing edge including an angled profile.

Additionally, or alternatively, in this or other non-limiting examples, the end plate projects outwardly of the blade base substantially entirely about the blade body.

Additionally, or alternatively, in this or other non-limiting examples, the propeller blade is part of a variable pitch propeller assembly.

BRIEF DESCRIPTION OF THE DRAWINGS

The following descriptions should not be considered limiting in any way. With reference to the accompanying drawings, like elements are numbered alike:

FIG. 5 is a tip view of the a variable pitch propeller blade having an end plate, in accordance with a non-limiting example;

FIG. 6 depicts a chamfer between the end plate and a body of the variable pitch propeller blade, in accordance with a non-limiting example; and FIG. 7 depicts a fillet between an end plate having a curved radial outer surface of the a variable pitch propeller blade, in accordance with a non-limiting example.

DETAILED DESCRIPTION

A detailed description of one or more non-limiting examples of the disclosed apparatus and method are presented herein by way of exemplification and not limitation with reference to the Figures.

Figure 1:
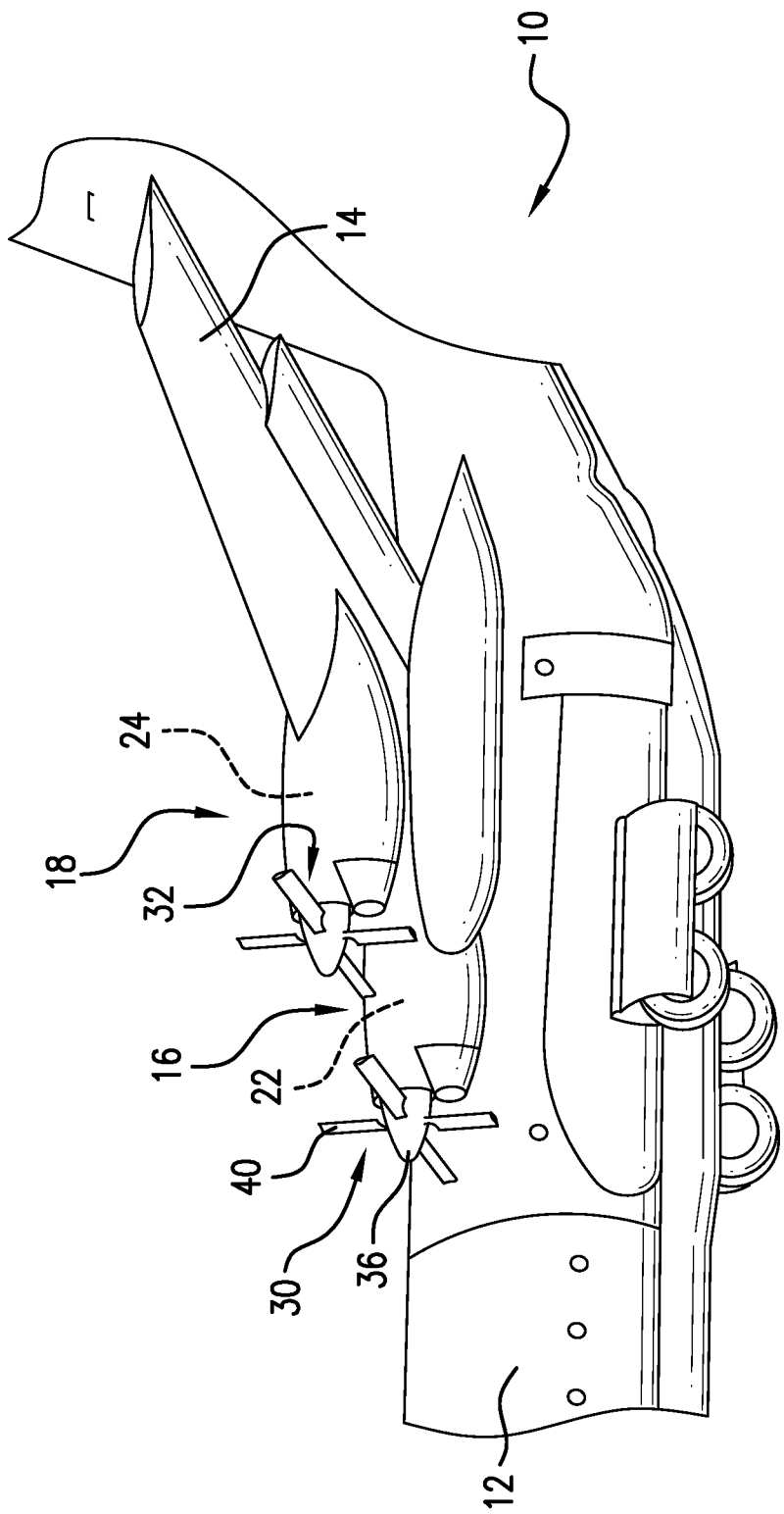
FIG. 1 depicts an aircraft including a variable pitch propeller blade having an end plate, in accordance with a non-limiting example.
Figure 2:
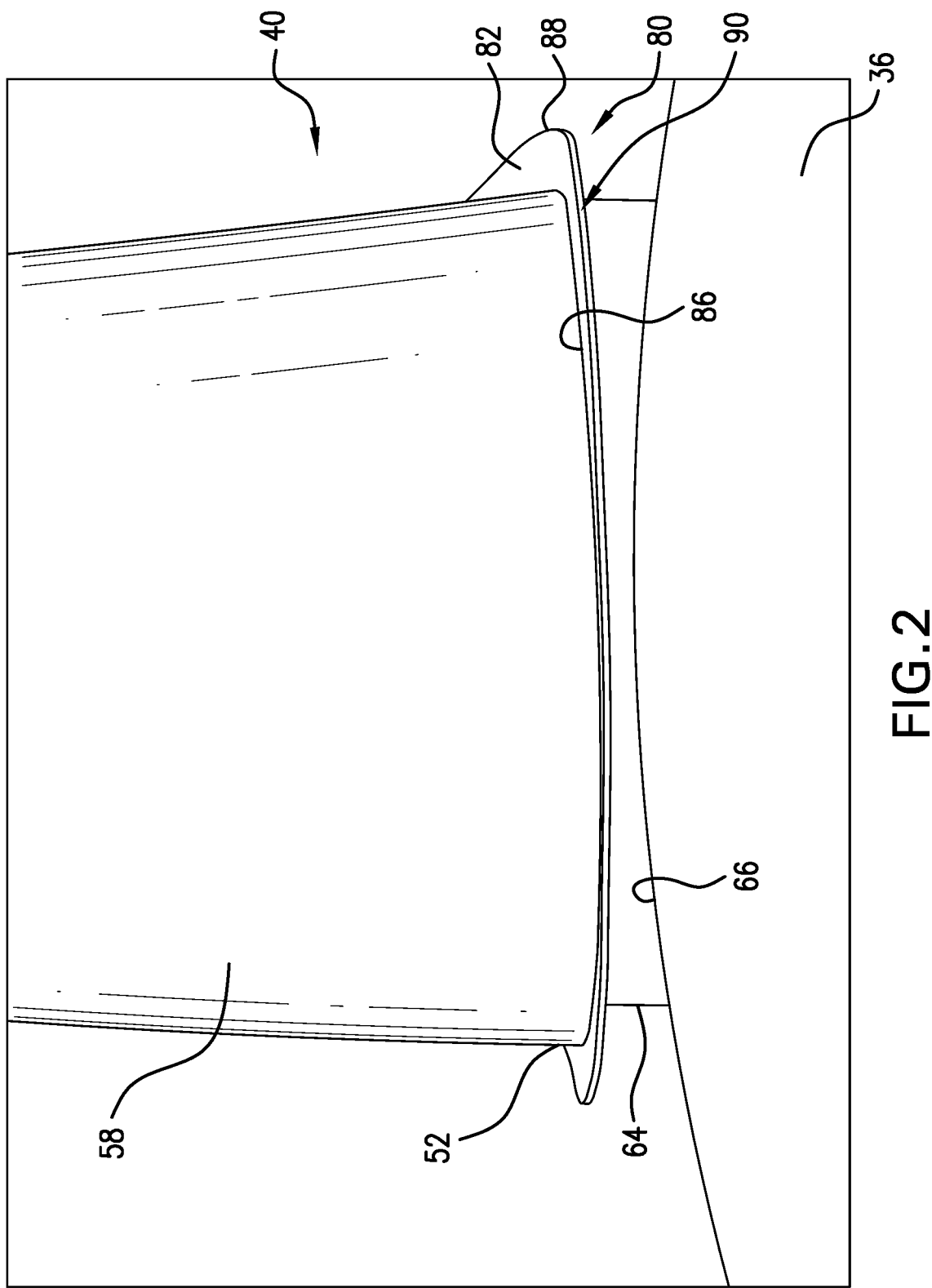
FIG. 2 is a partial front view of the variable pitch propeller blade having an end plate, in accordance with a non-limiting example.
Figure 3:
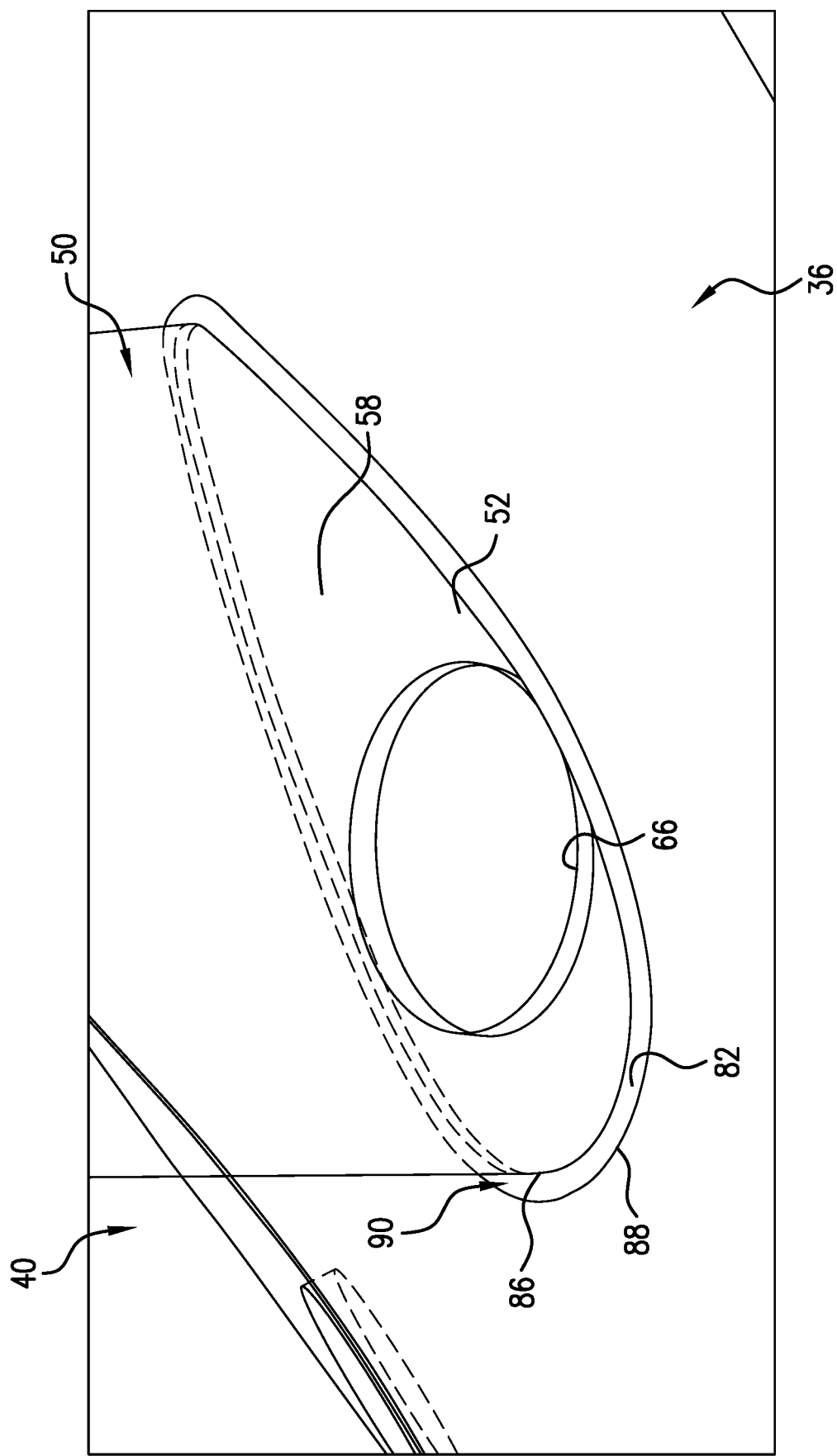
FIG. 3 depicts a partial glass view of the variable pitch propeller blade having an end plate, in accordance with a non-limiting example.
Figure 4:
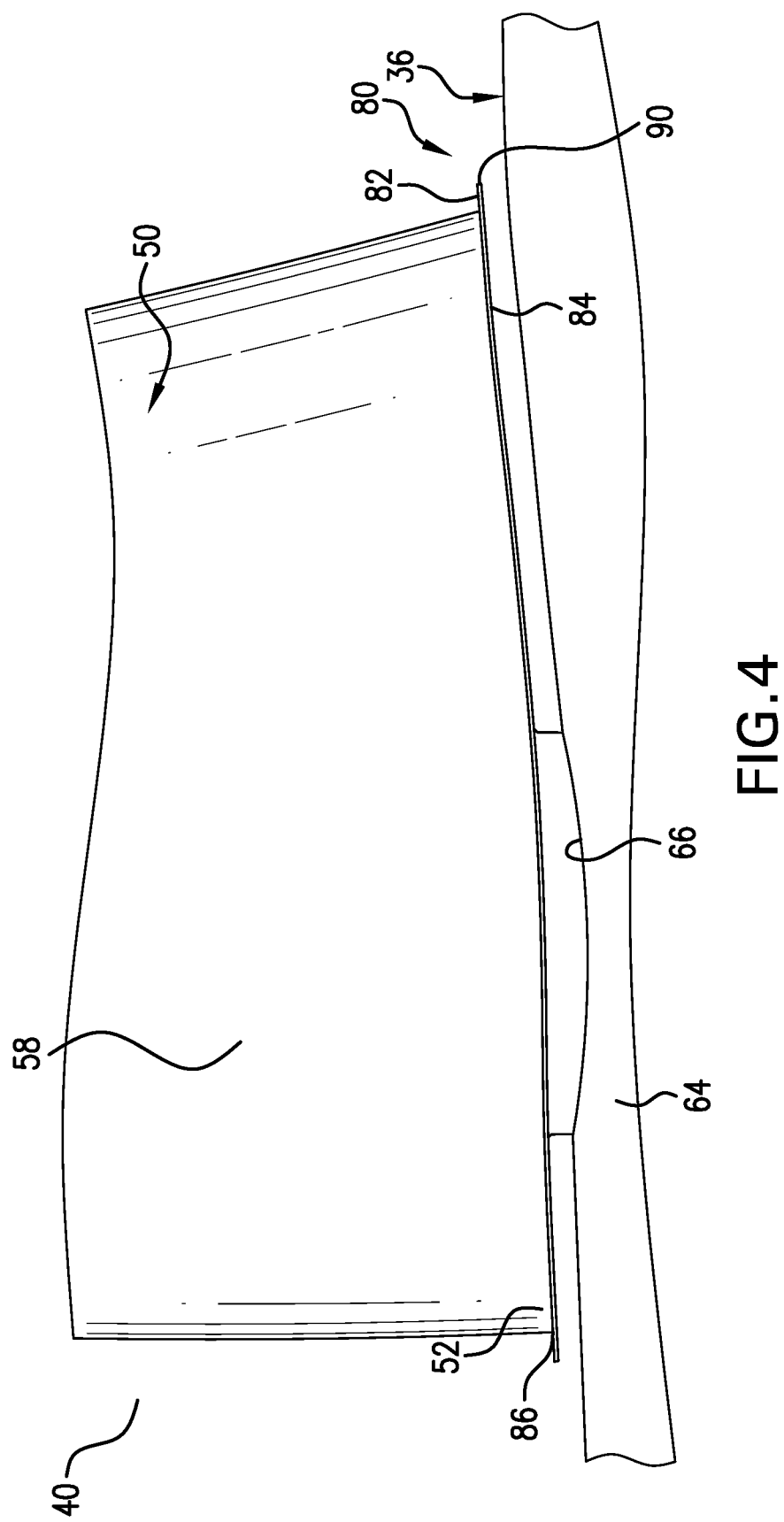
FIG. 4 depicts a partial side view of the variable pitch propeller blade having an end plate, in accordance with a non-limiting example.

With initial reference to FIG. 1, an aircraft in accordance with a non-limiting example is indicated generally at 10. Aircraft 10 includes a fuselage 12 that supports a pair of wings, one of which is indicated at 14. Wing 14 supports a first engine nacelle 16 and a second engine nacelle 18. First engine nacelle 16 houses a first engine 22 and second engine nacelle 18 houses a second engine 24. A first propeller assembly 30 is operatively coupled to first engine 22 and a second propeller assembly 32 is operatively connected to second engine 24. At this point, a detailed description will follow to first propeller assembly 30, in accordance with a non-limiting example, with an understanding that second propeller assembly 32 and any additional propeller assembles (not shown) may include similar structure. Further it should be noted that the example of having two engines is not meant to be limiting Referring to FIGS. 2-5 and with continued reference to FIG. 1, first propeller assembly 30 includes an aerodynamic spinner 36 and a plurality of propeller blades, one of which is indicated generally at 40. Propeller blade 40 is, in a non-limiting example, variable pitch propeller blades, coupled to mechanical linkages (not shown) housed in aerodynamic spinner 36. Each propeller blade 40 includes a blade body 50 having a blade base 52 and a blade tip 54 between which extend aerodynamic surfaces including a pressure side surface 58 and a suction side surface 60. Each propeller blade 40 includes a longitudinal axis "A" and a radial axis "R" as shown in FIG. 5.

In a non-limiting example, propeller blade 40 includes a blade root 64 that extends from blade base 52 away from blade tip 54. Blade root 64 extends through an opening 66 in aerodynamic spinner 36. Blade root 64 connects to linkages housed in aerodynamic spinner 36 which operate to rotate propeller blade 40 about longitudinal axis "A" to adjust propeller blade pitch. Changing or adjusting propeller blade pitch modifies how much airflow passes over pressure side surface 58 and/or suction side surface 60 allows a pilot to adjust first propeller assembly 30 to different thrust levels. Changing thrust enhances aircraft control and increases efficiency when on the ground (taxiing), when landing, and during flight.

In a non-limiting example, propeller blade 40 includes an end plate 80 arranged at blade base 52. In a non-limiting example, end plate 80 projects outwardly of pressure side surface 58 and suction side surface 60 and circumscribes blade body 50. However, it should be understood that in other non-limiting examples, end plate 80 may include discontinuities and project out from blade body 50 only in select regions of propeller blade 40. When installed to, for example, first engine 22, end plate 80 is positioned radially outwardly of spinner 36. Thus, in operation, end plate 80 is exposed to air flowing over spinner 36.

End plate 80 includes an outwardly facing surface 82 and an opposing inwardly facing surface 84 that defines an axial thickness which, in accordance with non-limiting examples, may be uniform. At this point, it should be understood that the term "outwardly facing" describes a blade tip side surface and the term "inwardly facing" describes a blade root side surface. In accordance with other non-limiting examples the axial thickness may vary so as to define a taper. End plate 80 extends between a radially inwardly facing surface 86 coupled to blade body 50 and a radially outwardly facing edge 88 defining a radial thickness which, in accordance with a non-limiting example, may be uniform about blade body 50 or, in other non-limiting examples may vary.

Outwardly facing surface 82 and inwardly facing surface 84 define a skirt region 90 which, when propeller blade 40 is installed, forms a physical barrier that blocks or redirects fluid flow through opening 66 in aerodynamic spinner 36. That is, end plate 80 blocks and/or substantially prevents air flow passing from opening 66 outwardly over blade body 50 creating vortices that may detract from an aerodynamic efficiency of propeller blade 40.

In a non-limiting example shown in FIG. 6, end plate 80 is coupled to blade body 50 at an interface region (not separately labeled) including a chamfer 94. Chamfer 94 eases any airflow passing over blade base 52 to reduced sharp profile changes that may create vortices. Similarly, as shown in FIG. 7, end plate 80 is coupled to blade body 50 through an interface region (also not separately labeled) including a fillet 96 in accordance with another non-limiting example. Further, radially outwardly facing edge 88 may include various shapes including a square geometry as shown in FIG. 6, an angled profile such as a rounded geometry as shown in FIG. 7 as well as other geometries in accordance with non-limiting examples.

At this point, it should be understood that the non-limiting examples described herein provide structure for reducing the creation and movement of flow vortices from a spinner along a propeller blade so as to increase blade efficiency. The variable pitch propeller blade, in accordance with a non-limiting example, eliminates or at least reduces localized vortices that may be created by air flowing across or through gaps between the blade and the spinner thereby enhancing propeller blade efficient and power thrust generating capability.

The terms "about" and "Substantially" are intended to include the degree of error associated with measurement of the particular quantity based upon the equipment available at the time of filing the application. For example, "about" and/or "substantially" can include a range of ±8% or 5%, or 2% of a given value.

The terminology used herein is for the purpose of describing particular non-limiting examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary non-limiting example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular non-limiting examples disclosed as the best mode contemplated for carrying out this present disclosure, but that the present disclosure will include all non-limiting examples falling within the scope of the claims.

What is claimed is:

1. A propeller blade comprising:
   a blade body including a blade base, a blade tip, a pressure side surface, and a suction side surface, each of the pressure side surface and the suction side surface extending between the blade base to the blade tip; and an end plate provided on the blade body, the end plate having an outwardly facing edge exposed to an airflow and positioned at the blade base, the end plate projecting outwardly of at least a portion of one of the pressure side surface and the suction side surface.

2. The propeller blade according to claim 1, wherein the end plate projects outwardly of the pressure side surface and the suction side surface.

3. The propeller blade according to claim 1, wherein the end plate includes a radial thickness.

4. The propeller blade according to claim 3, wherein the radial thickness is substantially uniform.

5. The propeller blade according to claim 1, wherein the end plate includes an axial thickness that is substantially uniform.

6. The propeller blade according to claim 1, further comprising: a blade root that extends outwardly of the blade base, the end plate creating a physical barrier between the blade body and the blade root.

7. The propeller blade according to claim 1, further comprising: an interface region defined between the blade body and the end plate, the interface region including one of a fillet and a chamfer.

8. The propeller blade according to claim 1, wherein the outwardly facing edge including an angled profile.

9. The propeller blade according to claim 8, wherein the angled profile is curvilinear.

10. The propeller blade according to claim 1, wherein the end plate projects outwardly of the blade base substantially entirely about the blade body.

11. An aircraft comprising:
a fuselage;
an engine supported by the fuselage; and
a propeller blade operatively connected to the engine and housed in a spinner, the propeller blade comprising:
a blade body including a blade base, a blade tip, a pressure side surface, and, a suction side surface, each of the pressure side surface and the suction side surface extending between the blade base to the blade tip; and
an end plate provided on the blade body and positioned at the blade base radially outwardly of the spinner, the end plate including an outwardly facing edge exposed to an airflow and projecting outwardly of at least a portion of one of the pressure side surface and the suction side surface.

12. The aircraft according to claim 11, wherein the end plate projects outwardly of the pressure side surface and the suction side surface.

13. The aircraft according to claim 11, wherein the end plate includes a radial thickness.

14. The aircraft according to claim 13, wherein the radial thickness is substantially uniform.

15. The aircraft according to claim 11, wherein the end plate includes an axial thickness that is substantially uniform.

16. The aircraft according to claim 11, wherein the spinner includes an opening through which extends the propeller blade, the end plate creating a physical barrier between the blade body and the opening.

17. The aircraft according to claim 11, further comprising: an interface region defined between the blade body and the end plate, the interface region including one of a fillet and a chamfer.

18. The aircraft according to claim 11, wherein the outwardly facing edge including an angled profile.

19. The aircraft according to claim 11, wherein the end plate projects outwardly of the blade base substantially entirely about the blade body.

20. The aircraft according to claim 11, wherein the propeller blade is part of a variable pitch propeller assembly.

* * * * *